(12) United States Patent
Hsu (10) Patent No.: US 9,625,945 B2
(45) Date of Patent: Apr. 18, 2017

(54) PORTABLE COMPUTER

(71) Applicant: Wistron Corporation, New Taipei (TW)

(72) Inventor: Wen-Chieh Hsu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/807,421

(22) Filed: Jul. 23, 2015

(65) Prior Publication Data

US 2016/0259373 A1 Sep. 8, 2016

(30) Foreign Application Priority Data

Mar. 2, 2015 (TW) .............................. 104106520 A (51) Int. Cl.
*G06F 1/16* (2006.01)

(52) U.S. Cl.
CPC ............ *G06F 1/1632* (2013.01); *G06F 1/169* (2013.01); *G06F 1/1615* (2013.01); *G06F 1/1633* (2013.01)

(58) Field of Classification Search
CPC combination set(s) only.
See application file for complete search history.

(56) References Cited

U.S. PATENT DOCUMENTS 8,929,067 B2 1/2015 Wu et al.

FOREIGN PATENT DOCUMENTS

| TW | M370214 U | 12/2009 |
|----|-----------|---------|
| TW | 201312543 A1 | 3/2013 |
| TW | I469723 B | 1/2015 |

*Primary Examiner* — Lisa Lea Edmonds
(74) *Attorney, Agent, or Firm* — Muncy, Geissler, Olds & Lowe, P.C.

(57) ABSTRACT

A portable computer has a base, a platform and a moving assembly. The base has an accommodating space. The platform is movably situated in the accommodating space. The platform has a first position and second position relative to the base. The moving assembly situated in the base has a moving element and a guiding structure. The moving element connects with the platform and moves along the guiding structure within the accommodating space to allow the platform to move between the first position and the second position relative to the base.

19 Claims, 8 Drawing Sheets

PORTABLE COMPUTER

BACKGROUND OF THE INVENTION

1. Field of the Invention

The present invention relates to a portable computer with a movable stage.

2. Description of the Related Art

Recently, with rapid developments in technologies related to electronic devices, it is common to own both a smart phone and a laptop computer at the same time. The connection between the smart phone and the laptop computer often relies on transmission cables for data transmission, and the smart phone can be charged by the laptop computer via the cable. However, smart phones from different makers require transmission cables of significantly different specifications. When users forget to carry a transmission cable that matches the smart phone in use, they can neither transmit data nor charge the smart phone. This situation causes a burden to users, and therefore an improvement is needed.

SUMMARY OF THE INVENTION

It is an object to provide a portable computer with a movable stage for bearing a hand-held device thereon.

To achieve the abovementioned object, the portable computer of the present invention has a case, a stage, and a moving assembly. The case includes an accommodating space. The stage is movably disposed in the accommodating space for allowing the stage to be positioned in a first position and a second position relative to the case. The moving assembly is disposed in the case and includes a moving element and a guiding structure. The first end of the moving element is connected to the stage. When the second end of the moving element moves along the guiding structure, the stage moves from the first position to the second position relative to the case.

The present invention further provides a portable computer with a case, a stage, and a moving assembly. The case includes an accommodating space, and the stage is movably disposed in the accommodating space such that the stage can be positioned relative to the case in a first position and a second position. The stage has a moving element; the first end of the moving element is disposed in and can move relative to the stage. The guiding structure is disposed in the case, and the second end of the moving element is movably disposed in the guiding structure. When the second end moves along the guiding structure, the stage moves relative to the case from the first position to the second position.

With the feature provided by the present invention, users can place a hand-held device such as a smart phone on the stage, and the weight of the smart phone will exert force such that the guide pillar will move within the guiding structure and consequently move the stage vertically from the first position down to the second position to allow the portable computer to wirelessly communicate with or charge the hand-held device without the use of transmission cables.

DETAILED DESCRIPTION OF THE PREFERRED EMBODIMENT

Figure 1:
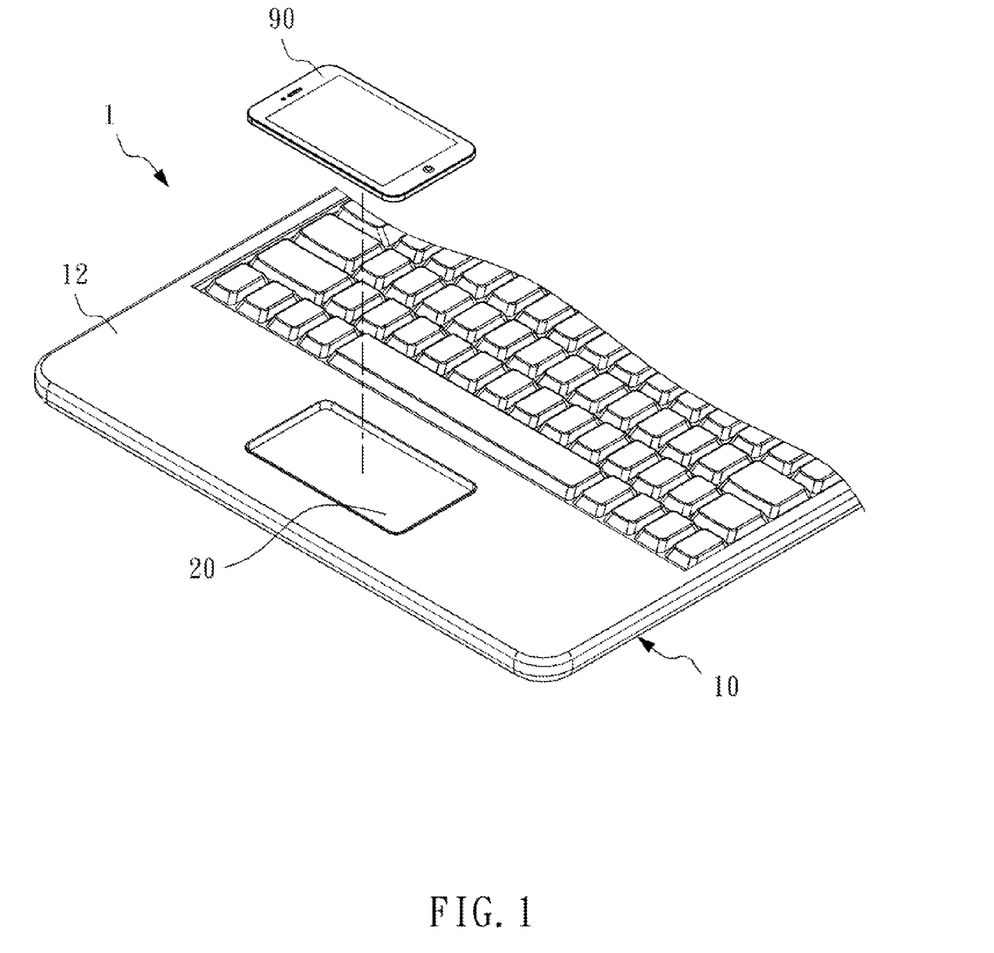
FIG. 1 is a schematic drawing illustrating the case of the portable computer connected with a hand-held device.
Figure 2:
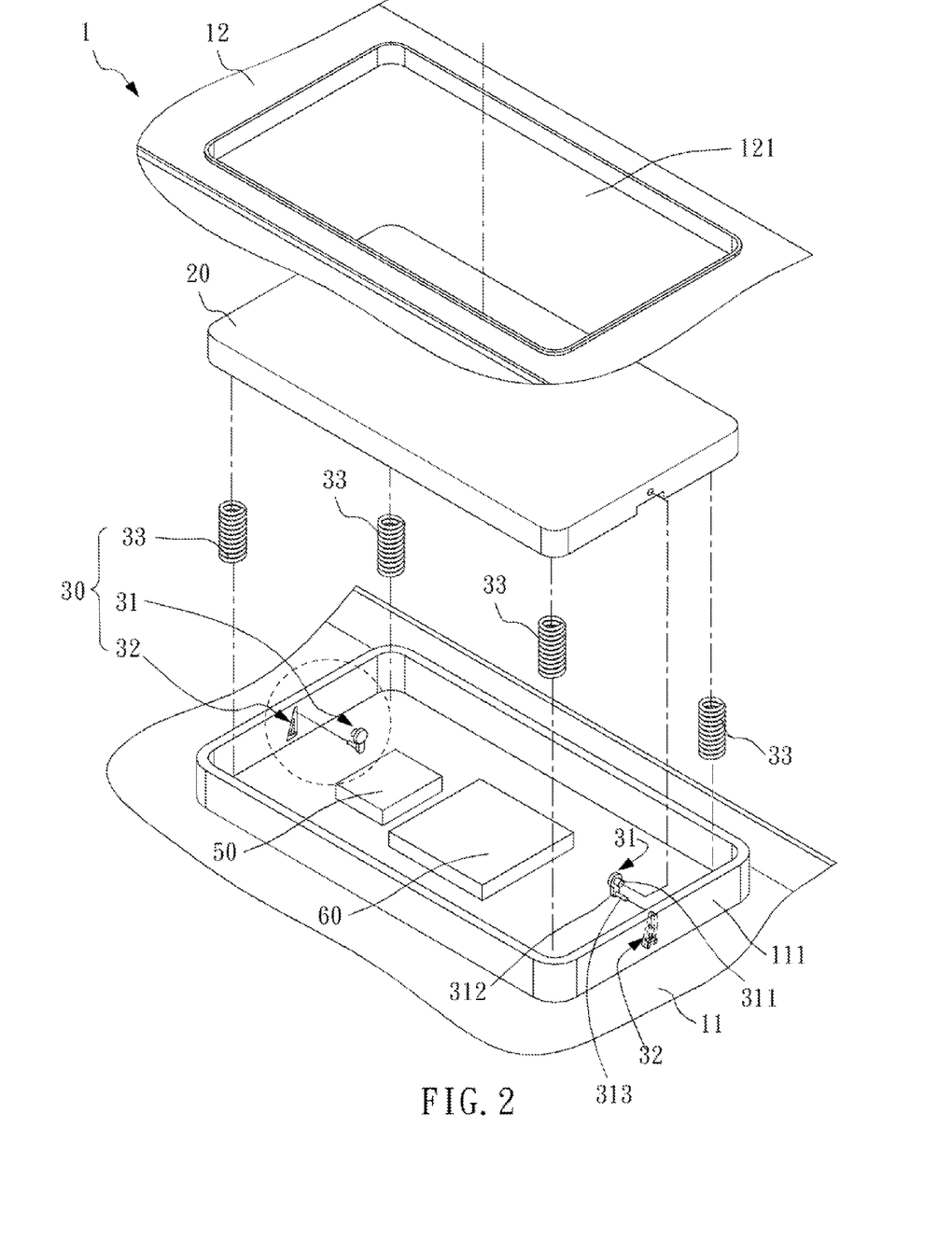
FIG. 2 is a partly exploded perspective view of an embodiment of the portable computer.

The technical content of the invention will become more apparent from the following detailed description of several preferred embodiments. Please refer to FIG. 1 and FIG. 2. FIG. 1 is a schematic drawing illustrating the case of the portable computer connected with a hand-held device. FIG. 2 is a partly exploded perspective view showing a portion of the portable computer of the present invention.

As shown in FIG. 1 and FIG. 2, the portable computer 1 of the present invention comprises a case 10, a stage 20, a moving assembly 30, a wireless communication module 50 and a wireless charging module 60, wherein the stage 20 is employed to bear a hand-held device 90. According to the present embodiment, the stage 20, the moving assembly 30, the wireless charging module 60 and the wireless communication module 50 are all disposed in the accommodating space 11 of the case 10, and the moving assembly 30 drives the stage 20 to move back and forth vertically relative to the case 10.

According to one embodiment of the present invention, the portable computer 1 is a laptop computer and the hand-held device 90 is a smart phone. However, depending on the type of the application, the portable computer 1 can be a tablet computer, a mini laptop, or other electronic device. The hand-held device 90 can be a tablet computer or other electronic device and is thus not limited to the present embodiment. Furthermore, a computer central processing unit and related electronic parts are also installed in the case 10. The wireless communication module 50 and the wireless charging module 60 are also among the related electronic parts mentioned above that are electronically connected with the computer central processing unit. According to one embodiment of the present invention, the wireless communication module 50 can be a Wi-Fi module or a Bluetooth module, and the wireless charging module 60 is a wireless charging device; however, the wireless connections are not thus limited to the present embodiment.

In the present embodiment, as shown in FIG. 1 and FIG. 2, the case 10 includes an accommodating space 11 and a top cover 12, wherein the accommodating space 11 is situated beneath the top cover 12. The accommodating space 11 includes a surrounding wall 111, and the top cover 12 has an opening 121. According to an embodiment of the present invention, the opening 121 is disposed in a location where a touchpad of the portable computer 1 commonly installed. The stage 20 and the moving assembly 30 are both disposed in the accommodating space 11 formed by the surrounding wall 111. The stage 20 moves vertically relative to the accommodating space 11 and is situated within the opening 121 such that the hand-held device 90 can be placed on the stage 20 after passing through the opening 121. In the present embodiment, the surrounding wall 111 is disposed around the opening 121; however, in other preferred embodiments, the surrounding wall 111 can be reduced to two individual walls protruding from the case 10.

In the present embodiment, as shown in FIG. 1 and FIG. 2, the moving assembly 30 includes two moving elements 31, two guiding structures 32 and four first elastic members 33, wherein the two moving element 31 are connected to the two opposite ends of the stage 20 individually. The two guiding structures 32 are disposed individually at the two opposite sides of the surrounding wall 111 and connect with one moving element 31. By this arrangement, each moving element 31 is allowed to move along the corresponding guiding structure 32 and consequently cause the stage 20 to move upward or downward along a vertical direction relative to the case 10. The four first elastic members 33 are beneath the stage 20, and each of the four corners of the stage 20 has one first elastic member 33 situated thereat. When the stage 20 moves downward along a vertical direction, the stage 20 gradually presses all of the first elastic members 33. In the present embodiment, the first elastic members 33 are springs and the quantities of the moving elements 31, guiding structures 32 and first elastic members 33 can be modified according to the design of the portable computer 1; the quantities are thus not limited to the present embodiment.

Figure 3:
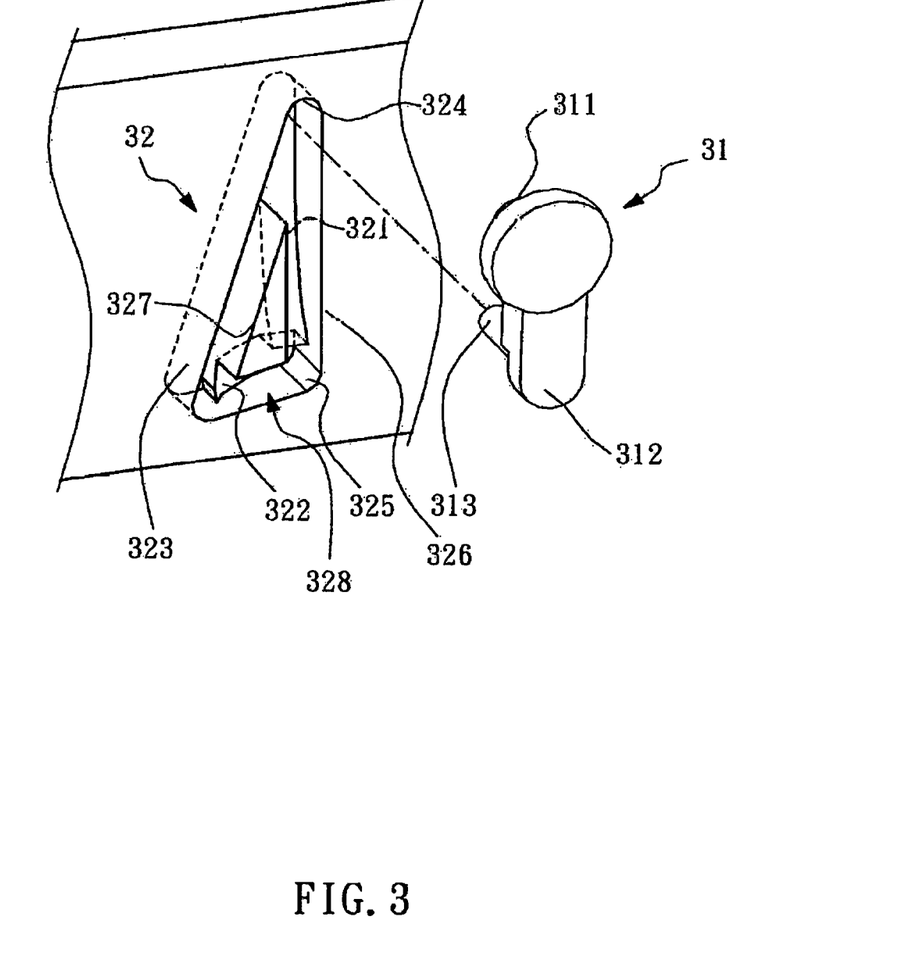
FIG. 3 is a schematic drawing illustrating the first embodiment of the moving element connected with the guiding structure.
Figure 4A:
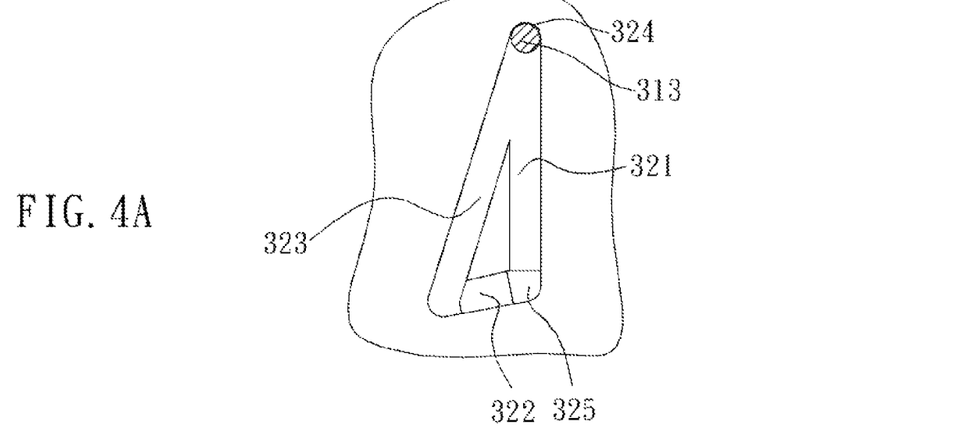
FIG. 4A, FIG. 4B and FIG. 4C are schematic drawings illustrating the guide pillar moving within the guiding structure.
Figure 4B:
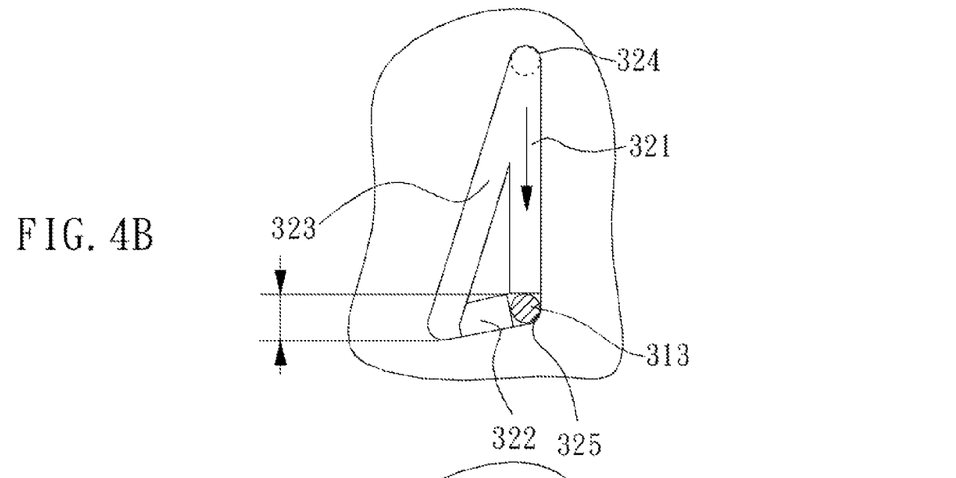
Figure 4C:
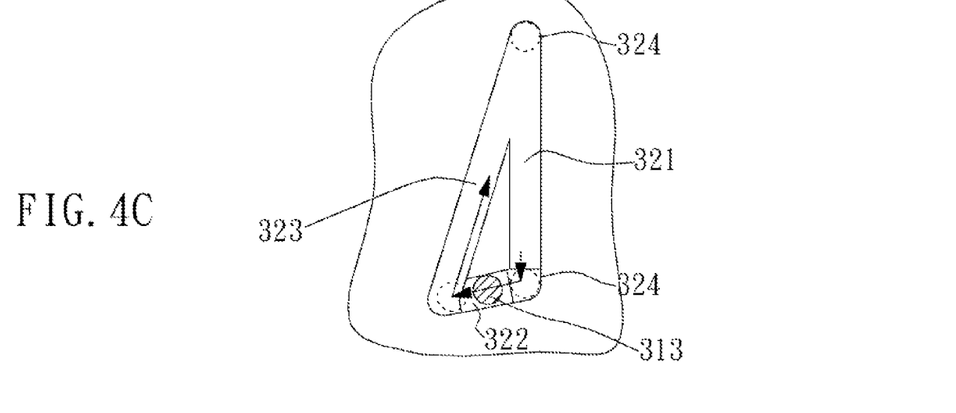
Figure 5A:
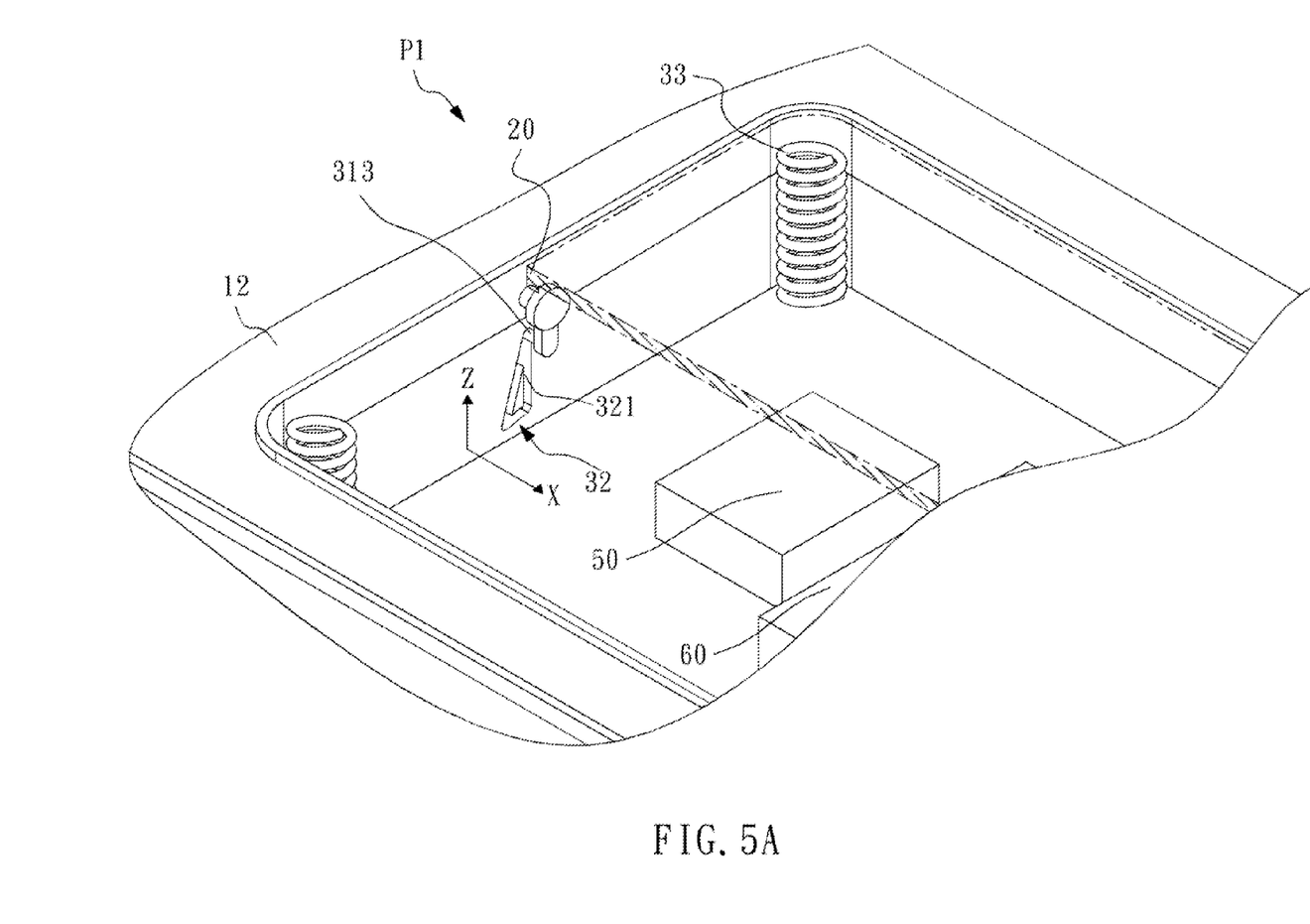
FIG. 5A is a partial cross-sectional drawing of the stage in the first position.
Figure 5B:
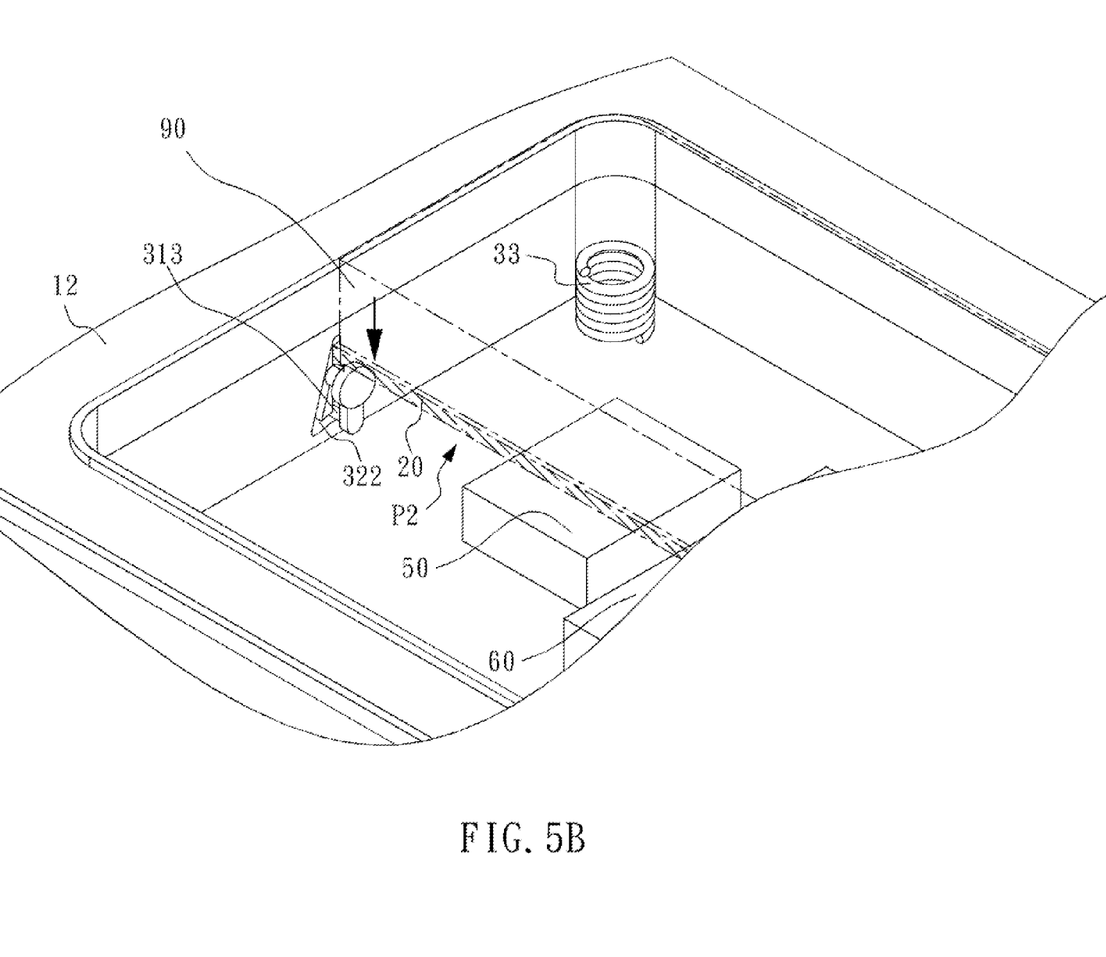
FIG. 5B is a partial cross-sectional drawing illustrating the stage moving to the second position.

Please refer to FIG. 2, FIG. 3, FIG. 4A to FIG. 4C, and FIG. 5A to FIG. 5B. FIG. 3 is a schematic drawing illustrating the first embodiment of the moving element connected with the guiding structure; FIG. 4A to FIG. 4C are schematic drawings illustrating the guide pillar moving within the guiding structure; FIG. 5A is a partial cross-sectional drawing of the stage in the first position; FIG. 5B is a partial cross-sectional drawing illustrating the stage moving to the second position.

In the present embodiment, the moving element 31 is an elastic arm made of rubber or elastic plastic. As shown in FIG. 2 and FIG. 3, the moving element 31 comprises a first end 311, a second end 312, and a guide pillar 313. The first end 311 and the second end 312 are individually disposed at the opposite ends of the moving element 31, and the first end 311 connects with the stage 20. The guide pillar 313 is disposed at the second end 312 and is situated within the guiding structure 32; thus, the moving element 31 can move along the guiding structure 32.

As shown in FIG. 3, the guiding structure 32 in the present embodiment is triangular in shape. However, the present invention is not limited to this; the guiding structure 32 can also be an ellipse, a circle or other closed geometrical shape. The guiding structure 32 comprises a first guide incline 321, a second guide incline 322, a moving section 323, a first fixed point 324, a second fixed point 325, a surrounding side-wall 326, and a protrusion 327. The second guide incline 322 and the moving section 323 connect with the two ends of the first guide incline 321 individually to form a closed triangular guiding path in the guiding structure 32. It is noted that, as shown in FIG. 3, in order to ensure that the guide pillar 313 can steadily move in the first guide incline 321, the second guide incline 322 and the moving section 323 without detaching from the guiding structure 32 and the first guide incline 321, both the highest point of the second guide incline 322 and the highest point of the moving section 323 are lower than the height of the surrounding side-wall 326 to prevent the guide pillar 313 from detaching from the guiding structure 32 while it is moving.

As shown in FIG. 4A to FIG. 4C, the first fixed point 324 is the highest point of the guiding structure 32 in the vertical direction, and it is situated at the location where the first guide incline 321 connects with the moving section 323. As shown in FIG. 3, the second fixed point 32 is the relatively lowest point of the first guide incline 321 in the vertical direction, and it is situated at the location where the first guide incline 321 connects with the second guide incline 322; i.e., the second fixed point 325 is situated at the location where the highest point of the first guide incline 321 connects with the lowest point of the second guide incline 322. Therefore, the guide pillar 313 can be fixed at the second fixed point 325 due to the drop in height between the first guide incline 321 and the second guide incline 322.

As shown in FIG. 3, the surrounding side-wall 326 in the present embodiment is a closed triangular shape. The protrusion 327 in the present embodiment is triangular and is situated close to the center of the surrounding side-wall 326. A dented area 328 for allowing the guide pillar 313 to move along the guiding structure 32 is formed between the surrounding side-wall 326 and the protrusion 327. In addition, the first guide incline 321, the second guide incline 322, and the moving section 323 are all situated within this dented area 328. It is noted that, as long as the shape of the protrusion 327 is sufficiently similar to the shape of the surrounding side-wall 326, the shapes of the surrounding side-wall 326 and the protrusion 327 are not limited to the present embodiment.

As shown in FIG. 4A and FIG. 5A, when the stage 20 is held in the first position P1 relative to the case 10 by the support provided by the first elastic member 33, the guide pillar 313 is situated at the first fixed point 324, and the stage 20 is close to the top cover 12 for receiving the hand-held device 90. When hand-held device 90 is placed on the stage 20, the stage 20 is forced to move downward and vertically from the first position P1 to the second position P2 due to the weight of the hand-held device 90 or a pressing force applied by the user applied thereon. It is noted that in the present embodiment, the first external force refers to the weight of the hand-held device 90 applied on the stage 20. As shown in FIG. 3, FIG. 4A and FIG. 4B, the first external force presses the first elastic member 33 and forces the guide pillar 313 to detach from the first fixed point 324 and to ascend along the first guide incline 321, which consequently causes the guide pillar 313 to move downward and vertically until the guide pillar 313 reaches the highest point of the first guide incline 321 and then slides into the second fixed point 325.

As shown in FIG. 3, FIG. 4A and FIG. 4B, there is a drop in height at the connecting point of the first guide incline 321 and the second guide incline 322; thus, the guide pillar 313 can be fixed at the second fixed point 325 and the stage 20 can be fixed in the second position P2 as well, as shown in FIG. 4B and FIG. 5B. Furthermore, when the stage 20 moves downward to the second position P2, the hand-held device 90 is roughly equal to or slightly lower than the top cover 12; i.e., the hand-held device 90 does not protrude from the top cover 12, and the user can manipulate the keyboard module of the portable computer 1 with no interference. It is noted that, as shown in FIG. 5A, because the first guide incline 321 and the second guide incline 322 are both inclines, the guide pillar 313 performs both Z-axis and X-axis movement. Thus, the guide pillar 313 is designed as an elastic arm to facilitate the X-axis movement of the moving element 31.

It is noted that, as shown in FIG. 5B, the portable computer 1 can perform various interactions with the hand-held device 90; for example, the portable computer 1 can wirelessly communicate with the hand-held device 90 via the wireless communication module 50 and the wireless communication module of the hand-held device 90. Furthermore, the hand-held device 90 can be wirelessly charged by the wireless charging module 60 of the portable computer 1. Furthermore, the hand-held device 90 is placed on a location where the touchpad is commonly installed; therefore, when the hand-held device 90 is placed in the stage 20 and the stage 20 is in the second position P2, the hand-held device 90 can be employed as a touchpad of the portable computer 1 through modifying the software/firmware configurations of the portable computer 1. It is noted that the above-mentioned applications are for illustration only, and the present invention is thus not limited to these embodiments. In addition, because wireless communication, wireless charging, and other interactions between the portable computer 1 and the hand-held device 90 are not the major improvement of the present invention and those technologies are well-known arts, no description is provided.

Figure 5C:
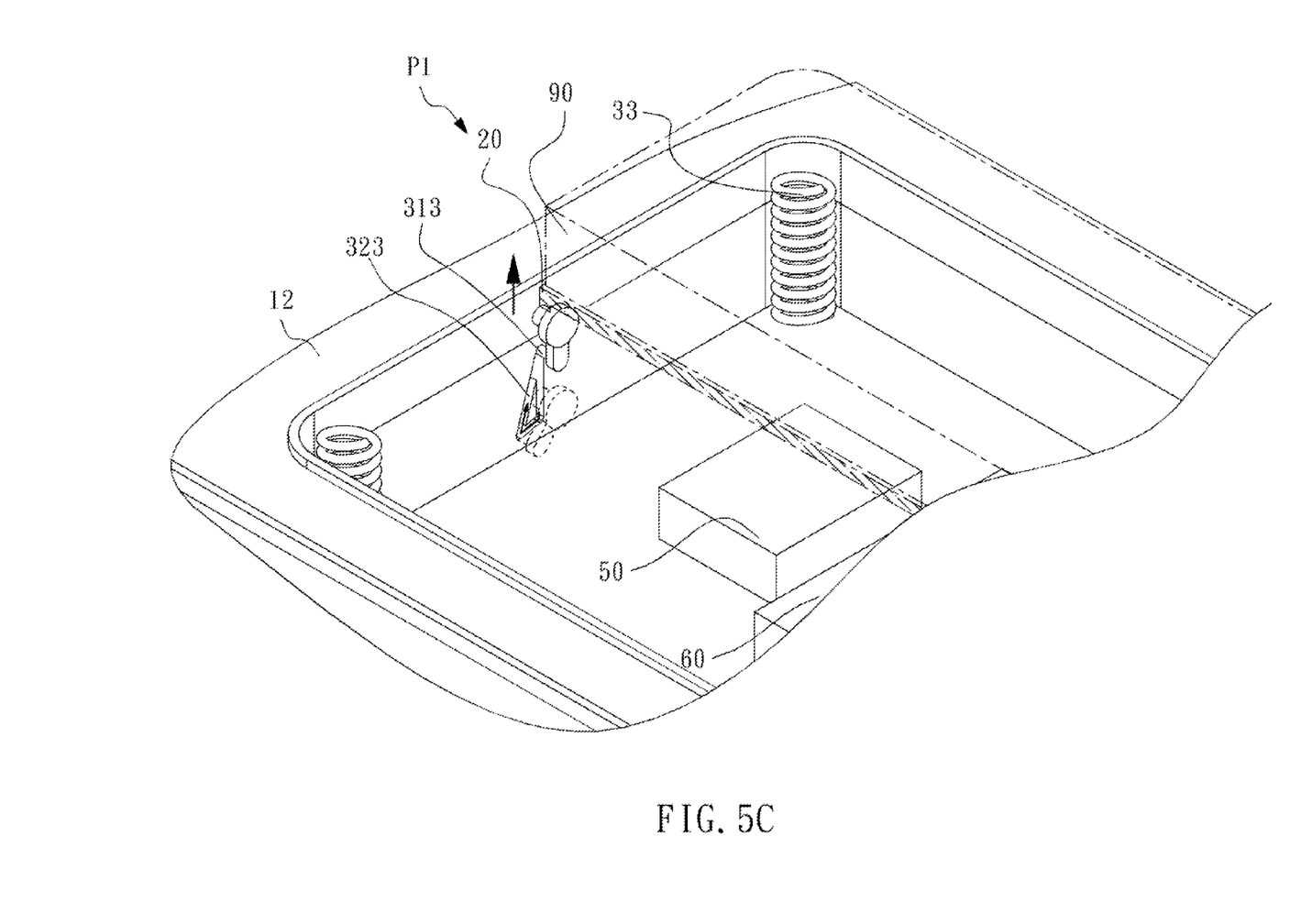
FIG. 5C is a partial cross-sectional drawing illustrating the stage moving from the second position back to the first position.

As shown in FIG. 5 B, when the stage 20 is in the second position P2 and a user would like to remove the hand-held device 90, the user presses the hand-held device 90. Due to the pressure applied onto the hand-held device 90, as shown in FIG. 3, FIG. 4C, and FIG. 5B, the guide pillar 313 detaches from the second fixed point 325 and ascends from right to left along the second guide incline 322 until it reaches the highest point of the second guide incline 322 and then enters the moving section 323, whose height is less than the highest point of the second guide incline 322. In other words, during the above-mentioned moving path, the moving element 31 performs a rotation relative to the stage 20. After the guide pillar 313 has fallen into the moving section 323, the resilience of each of the first elastic members 33 forces the stage 20 to move upward and cause the guide pillar 313 to move upward within the moving section 323 until reaches the first fixed point 324. As a result, as shown in FIG. 4A and FIG. 5C, the stage 20 returns to the first position P1, the hand-held device 90 is in position for the user to remove it, and the stage 20 completes a back and forth vertical movement between the first position P1 and the second position P2. It is noted that in this embodiment, the second external force refers to the pressure applied on the hand-held device 90 by the user.

Figure 6A:
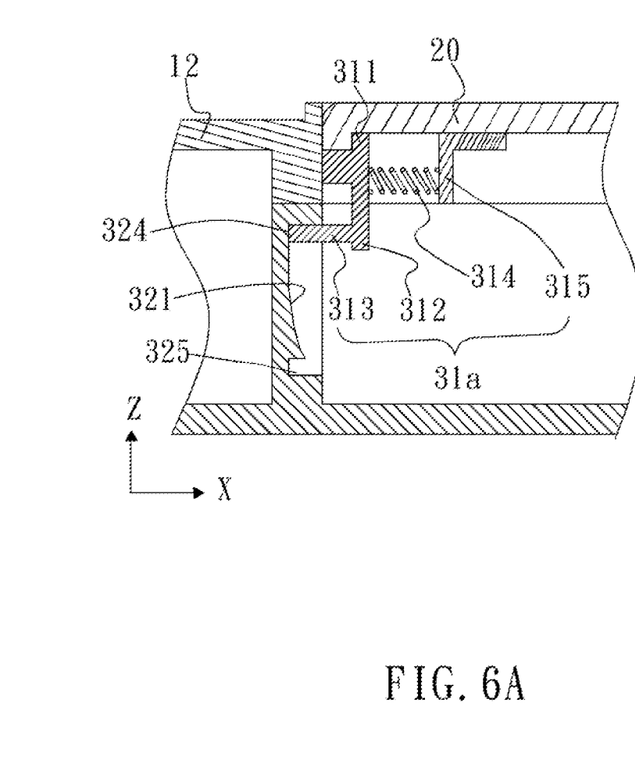
FIG. 6A and FIG. 6B are cross-sectional drawings illustrating the second embodiment of the moving element moving in the first guide incline.
Figure 6B:
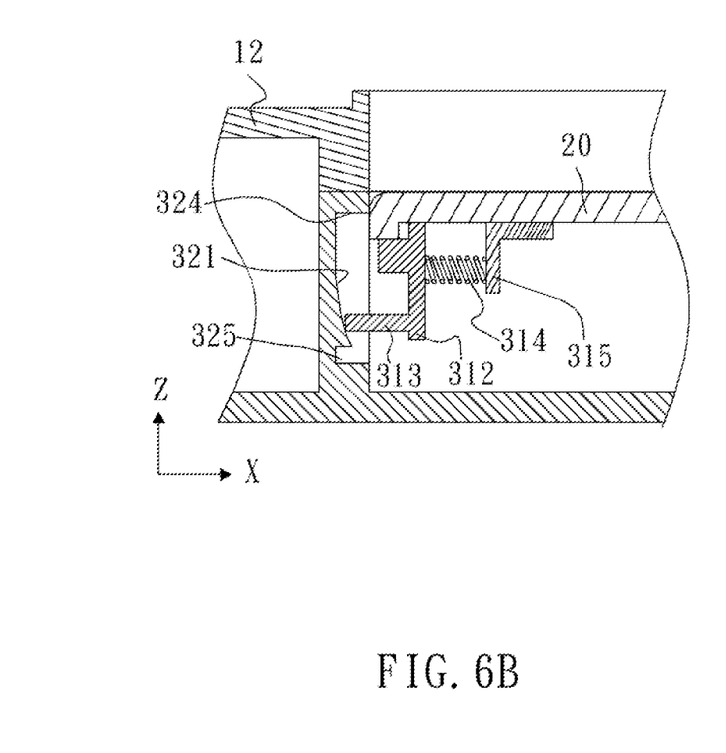

Please refer to FIG. 3, FIG. 4A to FIG. 4C, FIG. 6A, and FIG. 6B, wherein FIG. 6A and FIG. 6B are cross-sectional drawings illustrating the second embodiment of the moving element moving in the first guide incline.

As shown in FIG. 6A, the moving element 31a in the present embodiment has no elasticity, and the moving element 31a comprises a second elastic member 314 and a link plate 315. The link plate 315 connects with one end of the second elastic member 314, and a side of the first end 311 which does not connect with the stage 20 connects with the other end of the second elastic member 314. As shown in FIG. 6A and FIG. 6B, when the stage 20 is forced to move downward by an external force, the guide pillar 313 detaches from the first fixed point 324, ascends along the first guide incline 321 vertically, and then enters the second fixed point 325. Because the first guide incline 321 is an incline, during the above-mentioned moving path, the guide pillar 313 both performs Z-axis and X-axis movements. In this embodiment, because the guide pillar 313 has no elasticity, the X-axis movement of the guide pillar 313 is completed by the second elastic member 314, which is a spring in the present embodiment.

To sum up, the present invention employs the guide pillar 313 with the guiding structure 32 and the resilience of the first elastic member 33 to allow the stage 20 to move vertically between the first position P1 and the second position P2 relative to the case 10. The drop in height between the first guide incline 321 and the second guide incline 322 is applied to fix the guide pillar 313 which allows the stage 20 to be fixed in the second position P2, and then the portable computer 1 can wirelessly communicate with or charge the hand-held device 90 wirelessly via the wireless communication module of the hand-held device 90 without the use of transmission cables.

As described above, the objectives, means, and effectiveness of the present invention differ from the characteristics of the prior art. It should be noted that the embodiments described above are for illustrating the principles and effects of the present invention, and not for limiting the scope of the present invention. Any person skilled in the art shall be able to make modifications and changes to the embodiments without departing from the technical principle and spirit of the present invention. The claims of the present invention within the scope of protection are described below.

What is claimed is:

1. A portable computer comprising:
a case with an accommodating space;
a stage movably disposed within the accommodating space and being positioned relative to the case within the accommodating space in a first position and a second position;
a moving assembly disposed in the case comprising:
a moving element with a first end and a second end, wherein the first end is located in the stage and moves relative to the stage; and
a guiding structure, wherein the second end is movably disposed in the guiding structure such that when the second end moves along the guiding structure, the stage moves downward relative to the accommodating space of the case from the first position to the second position.

2. The portable computer as claimed in claim 1, the guiding structure comprising a first guide incline, a second guide incline and a moving section, wherein two ends of the first guide incline connect with the second guide incline and the moving section respectively to form a closed guiding path in the guiding structure.

3. The portable computer as claimed in claim 2, the guiding structure comprising a surrounding side-wall and a protrusion, wherein a dented area is formed between the surrounding side-wall and the protrusion to allow the second end to move along the guiding structure; the first guide incline, the second guide incline, and the moving section are all situated within the dented area.

4. The portable computer as claimed in claim 2, wherein a first fixed point is formed at the guiding structure where the first guide incline connects with the moving section, and a second fixed point is formed at the guiding structure where the first guide incline connects with the second guide incline.

5. The portable computer as claimed in claim 2, wherein the closed guiding path is in the shape of an ellipse, a circle, or a triangle.

6. The portable computer as claimed in claim 4, the moving element comprising a guide pillar, the guide pillar being disposed in the second end and situated in the guiding structure to allow the moving element to move within the guiding structure; when the stage is positioned in the first position, the guide pillar is situated at the first fixed point, wherein the first fixed point is the relatively lowest portion of the first guide incline.

7. A portable computer comprising:

a case with an accommodating space;

a stage movably disposed within the accommodating space and positioned relative to the case within the accommodating space in a first position and a second position, wherein the stage has a moving element and the moving element comprises a first end and a second end; wherein the first end is located in the stage and moves relative to the stage; and a guiding structure disposed in the case, wherein the second end is movably disposed in the guiding structure; when the second end moves along the guiding structure, the stage moves downward relative to the accommodating space of the case from the first position to the second position.

8. The portable computer as claimed in claim 7, wherein the moving element is rotatably disposed in the stage.

9. The portable computer as claimed in claim 8, the guiding structure comprising a first guide incline, a second guide incline and a moving section, wherein two ends of the first guide incline connect with the second guide incline and the moving section respectively to form a closed guiding path in the guiding structure.

10. The portable computer as claimed in claim 9, the guiding structure comprising a surrounding side-wall and a protrusion, wherein a dented area is formed between the surrounding side-wall and the protrusion to allow the second end to move along the guiding structure; the first guide incline, the second guide incline, and the moving section are all situated within the dented area.

11. The portable computer as claimed in claim 9, wherein a first fixed point is formed at the guiding structure where the first guide incline connects with the moving section, and a second fixed point is formed at the guiding structure where the first guide incline connects with the second guide incline.

12. The portable computer as claimed in claim 9, wherein the closed guiding path is in the shape of an ellipse, a circle, or a triangle.

13. The portable computer as claimed in claim 11, the moving element comprising a guide pillar, the guide pillar being disposed in the second end and situated in the guiding structure to allow the moving element to move within the guiding structure; when the stage is positioned in the first position, the guide pillar is situated at the first fixed point, wherein the first fixed point is the relatively lowest portion of the first guide incline.

14. The portable computer as claimed in claim 13, wherein when a first external force is applied on the stage and the stage accordingly moves downward from the first position, the guide pillar detaches from the first fixed point and ascends along the first guide incline until the guide pillar enters the second fixed point such that the stage is fixed in the second position, wherein the second fixed point is the relatively lowest portion of the second guide incline.

15. The portable computer as claimed in claim 9, wherein a height of the moving section is lower than the relatively highest portion of the second guide incline.

16. The portable computer as claimed in claim 9, the moving assembly comprising a first elastic member, wherein when the stage is positioned in the second position, the stage presses the first elastic member.

17. The portable computer as claimed in claim 16, wherein when the stage is positioned in the second position and then a second external force is applied on the stage, the stage moves upward in the accommodating space from the second position; a guide pillar detaches from a second fixed point, ascends along the second guide incline and then slides into the moving section; when the guide pillar is in the moving section, a resilience force of the first elastic member forces the guide pillar to move along the moving section and back to a first fixed point and consequently causes the stage to move upward from the second position to the first position.

18. The portable computer as claimed in claim 9, the moving element comprising a second elastic member, wherein one end of the second elastic member connects with the first end.

19. The portable computer as claimed in claim 18, the moving element comprising a link plate, and another end of the second elastic member connects with the link plate.

* * * * *